United States Patent Office 3,530,012
Patented Sept. 22, 1970

3,530,012
METHOD OF TREATING METAL SURFACES
Akira Nakamura and Noboru Sakamoto, Osaka, Tatsuo Kataoka, Tokyo, and Motoo Kawasaki, Hirakata, Japan, assignors to Rasa Kasei Kabushiki Kaisha, Tokyo, Japan
No Drawing. Filed Dec. 20, 1966, Ser. No. 603,090
Claims priority, application Japan, Dec. 23, 1965, 40/79,152
Int. Cl. G23f 7/10
U.S. Cl. 148—6.15
8 Claims

ABSTRACT OF THE DISCLOSURE

A method for the treatment of metal surfaces containing iron or steel in order to form a corrosion-proofing film thereon is provided. The metal surface need not be treated to remove foreign matter such as oil, grease and/or rust prior to treatment. The surface is coated with the solution and subsequently dried. Solutions are also provided as well as the treated article. The solution is water, organic solvent or mixture of water and organic solvent containing at least one ultraphosphate. The solution may additionally contain phosphoric acid, phosphates, polyphosphoric acid and polyphosphates as well as other additives.

---

The present invention relates to the art of treating metal surfaces and more particularly to the method of treating an iron or steel containing surface in order to form a corrosion-proofing film thereon. The invention also relates to an article having an iron or steel containing surface having a corrosion-proofing coating prepared in accordance with the invention. The method of the present invention is particularly suitable for forming an undercoating for large structures in order to corrosion-proof the surfaces thereof.

Heretofore, the art has endeavored to form a corrosion-proofing film over an iron or steel containing surface by first cleaning the surface in order to remove any foreign material, particularly grease, oil and rust, and, following the cleaning step, coating the surface by spraying or immersing in a solution which forms a corrosion-proofing film over the surface. The solutions which have heretofore been employed have been those containing certain ingredients in a solution of water or an organic solvent or of a mixture of the two. The previously employed solutions have been those containing at least one member selected from the group of phosphoric acid, phosphates, polyphosphoric acid and polyphosphates. The previously employed solutions have also contained, as desired and if necessary, one or more additives from the group of oxidants, reductants, accelerators, surface-active agents, and resins, either natural or synthetic, which do not quickly set or decompose in acidic liquids, as for example, polyvinyl butyral resin, shellac resin, amide resins, acryl latex, styrene, butadiene latex, acryl vinyl latex, and the like. Such additives as indicated may be used in the solutions either singly or in combination.

The heretofore employed method of utilizing the known corrosion-proofing solutions has suffered from a number of disadvantages. The surface to be protected must be treated to remove foreign material, as for example oil and grease as well as rust prior to the surface treating of the metal. In addition, the previously employed conventional solutions are low in chelating ability and therefore are inferior in film-forming ability. In addition, the conventional solutions tend to produce harmful hydrolysates which reduce the life of the solution and hinder the adherence of a finished coating to a film formed by the solution.

It is the purpose of the present invention to provide surface treating solutions free of such disadvantages.

It is likewise an object of the present invention to provide a method for the treating of iron and steel containing surfaces in order to form a corrosion-proofing film over such surface which method utilizes the solutions free from the previously encountered disadvantages.

It is also an object of the present invention to provide a method for treating iron and steel containing surfaces to form a corrosion-proofing film over such surface, which method permits the direct coating of such surface without requiring the prior removal of foreign substances, such as for example, oil and grease as well as rust.

It is also an object of the invention to provide an article containing an iron or steel containing surface which has a corrosion-proofing surface prepared in accordance with the method of the invention.

The objects of the present invention are accomplished by utilizing solutions containing at least one ultraphosphate. The ultraphosphate or mixtures thereof employed in the present invention and defined hereinbelow may provide the sole phosphorus containing ingredient in the solutions or, in the alternative, the ultraphosphate may be employed in conjunction with the additional phosphorus ingredients normally employed in the conventional solutions. Solutions containing the ultraphosphate according to the present invention are more stable in solutions having a low pH than are the previously employed conventional solutions containing polyphosphoric acid, polyphoshpate and ethyldiamine tetraacetic acid (EDTA). And, in addition, the solutions containing the ultraphosphates have a much higher chelating ability. In view of this, the solutions containing the ultraphosphates are highly reactive at normal temperatures and are quick in their film-forming ability. The presence of the ultraphosphates causes chelation of salts which occur in the applied solution and which are subject to hydrolysis. This property prevents the occurrence of a powdery substance that would reduce the adherence of the final coating and in addition, strengthens the adherence of the developed film to the protected metal surface and to the finished coating. When applied to an iron or steel containing surface having a scale or corrosion products contained thereon, such ultraphosphates react with the scale or rust and incorporate them into the film, thus eliminating the need for rust removal and other such pre-treatments required in the case of the conventional solutions. Also by controlling the hydrolysis of acidic phosphates in the film due to moisture which has penetrated through the finished coating, such ultraphosphates prevent occurrence of a powdery substance that would reduce the adherence of the film to the finished coating.

The solutions of the present invention may be prepared by formulating an aqueous solution containing the desired ultraphosphate, or by the addition of the ultraphosphate to a previously known corrosion-proofing solution. The solutions may contain, if desired, one or more of the following additives:

oxidants, e.g. peroxides, such as hydrogen peroxides;
reductants, e.g. metal chloride, such as stannous chloride;
surface active agents such as alkylbenzene-sulfonates; and
resins, either natural or synthetic, e.g. adherence-increasing, acid non-decomposable resins, such as polyvinyl butyral resin, shellac resin, amide resins, acryl latex, styrene, butadiene latex, acryl vinyl latex, and the like.
These additives are known in the art and, as such, do not form a part of the present invention.

The ultraphosphates referred to herein are salts of metals such as potassium (K), sodium (Na), tin (Sn), calcium (Ca), barium (Ba), magnesium (Mg), aluminum (Al), chromium (Cr), manganese (Mn), zinc (Zn), cadmium (Cd), iron (Fe), cobalt (Co), nickel (Ni, copper (Cu), lead (Pb), and the like. The ultraphosphates of the present invention are those phosphates having molar ratios expressed as MeO/P$_2$O$_5$ of smaller than 1 (wherein Me is one of the contemplated metals). Those particularly effective in preventing corrosion are the salts of Ca, Sn, Zn, Al, Cr, Mn, Fe, and Co. Typical solutions embodying the present invention are shown below:

SOLUTION 1

| | Percent |
|---|---|
| Aluminum ultraphosphate of the formula: Al$_2$O$_3$·nP$_2$O$_5$·xH$_2$O wherein $n \cong 12$ | 20 |
| Water | Balance |

SOLUTION 2

| | |
|---|---|
| Chromium ultraphosphate of the formula: CrO$_3$·nP$_2$O$_5$·xH$_2$O wherein $n \cong 6$ | 10 |
| Stannous chloride (as reductant) | 1 |
| H$_3$PO$_4$ (conc. 85 percent) | 20 |
| Denatured alcohol | 15 |
| Ethyl Cellosolve | 2 |
| Water | Balance |

SOLUTION 3

| | |
|---|---|
| Calcium ultraphosphate of the formula: CaO·nP$_2$O$_5$·xH$_2$O wherein $n \cong 20$ | 20 |
| Zinc polyphosphate | 15 |
| Polyvinyl butyral resin | 3 |
| Denatured alcohol | 50 |
| Water | Balance |

SOLUTION 4

| | |
|---|---|
| Zinc ultraphosphate of the formula: ZnO·nP$_2$O$_5$·xH$_2$O wherein $n \cong 12$ | 15 |
| Hydrogen peroxide | 0.5 |
| Acryl latex | 3 |
| Denatured alcohol | 30 |
| Water | Balance |

Certain tests were carried out to demonstrate the effectiveness of the method of the present invention utilizing the solutions containing ultraphosphates. The solutions described as Solutions 1 through 4 were applied to test pieces of iron. After being dried, the film on each piece was covered with a coating of a phenol type, lead-zinc type, or zinc-rich paint to form a corrosion preventive film.

For comparison, similar iron test pieces were cleaned of mill scale and rust with a wire brush and abrasive cloths and were coated in the same manner with the paints alone. In salt spray tests, pieces treated with the solutions of the present invention resisted corrosion 50 hours, 300 hours and 200 hours longer than the untreated iron pieces in the case of the zinc-rich, phenol type and zinc-lead type paints respectively. Thus, it was demonstrated that the solutions of the present invention containing the ultraphosphates are very effective in preventing corrosion.

Checkerboard tests, drawing tests and other physical tests failed to produce any unfavorable effect on films formed by solutions of the present invention.

When used herein, the symbol $\cong$ designates that the average value of $n$ for the ultraphosphate is that given. The ultraphosphates cannot be defined by simple molecular formula and are obtained in the form of a mixture wherein the average value of $n$ approximates the value given.

Having described the present invention, what is claimed is:

1. In the method for treating iron or steel containing surfaces which consists essentially of coating said surface with a solution and subsequently drying the solution to form a corrosion-proofing film over the said surface, the solution comprising a member selected from the group consisting of water solutions, organic solvent solutions and solutions containing a mixture of water and organic solvent, said solutions also containing a member selected from the group consisting of phosphoric acid, phosphates, polyphosphoric acid and polyphosphates, the improvement wherein the solution contains at least one ultraphosphate.

2. A method for the treatment of iron or steel surfaces as set forth in claim 1 wherein the solution additionally contains at least one member selected from the group consisting of oxidants, reductants, accelerators, surface-active agents, and adherence-increasing acid non-decomposable resins.

3. A method as in claim 1 wherein the ultraphosphate is the sole phosphorus containing ingredient in the solution.

4. A method for the treatment of iron or steel containing surfaces which consists essentially of coating the said surface with an aqueous solution of aluminum ultraphosphate and subsequently drying the coated article to form a corrosion-proofing film over the surface.

5. A method for the treating of iron or steel containing surfaces which consists essentially of coating the said surfaces with a water and organic solvent solution containing phosphoric acid and chromium ultraphosphate and drying said coated surface to form a corrosion-proofing film on the said surface.

6. A method for treating iron or steel containing surfaces which consists essentially of coating the said surfaces with a water and organic solvent solution containing calcium ultraphosphate and zinc polyphosphate and drying the said coated surface to form a corrosion-proofing film thereon.

7. A method for treating iron or steel containing surfaces which consists essentially of coating the said surfaces with a water and organic solvent solution containing zinc ultraphosphate and drying the coated surface to form a corrosion-proofing film thereon.

8. An article of manufacture having an iron or steel containing surface, said surface having a corrosion-proofing film formed from an ultraphosphate containing solution consisting essentially of a member selected from the group consisting of water solutions, organic solvent solutions and solutions containing a mixture of water and organic solvent, said solutions containing a member selected from the group consisting of phosphoric acid, phosphates, polyphosphoric acid and polyphosphates.

References Cited

UNITED STATES PATENTS

| 3,030,210 | 4/1962 | Chebiniak | 148—6.15 X |
| 3,050,406 | 8/1962 | Karlson | 148—6.15 X |
| 3,081,146 | 3/1963 | Boles et al. | 148—6.15 X |

OTHER REFERENCES

Thilo, Angew. Chem. Internat. Edit., vol. 4 (1965), No. 12, pp. 1061, 1071.

RALPH S. KENDALL, Primary Examiner